CHARLES F. VAN HOOK INVENTOR.

BY George F. Gill
Attorney

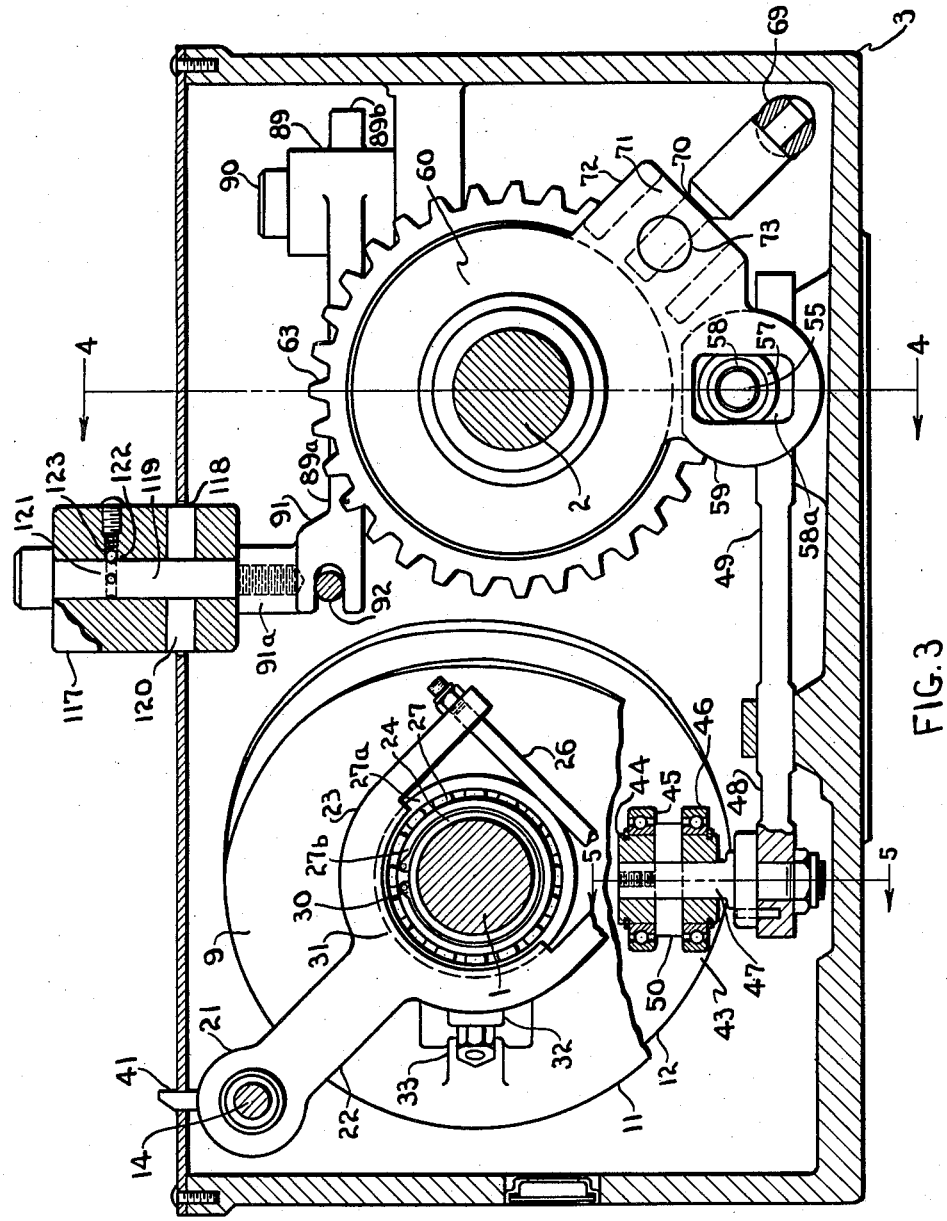

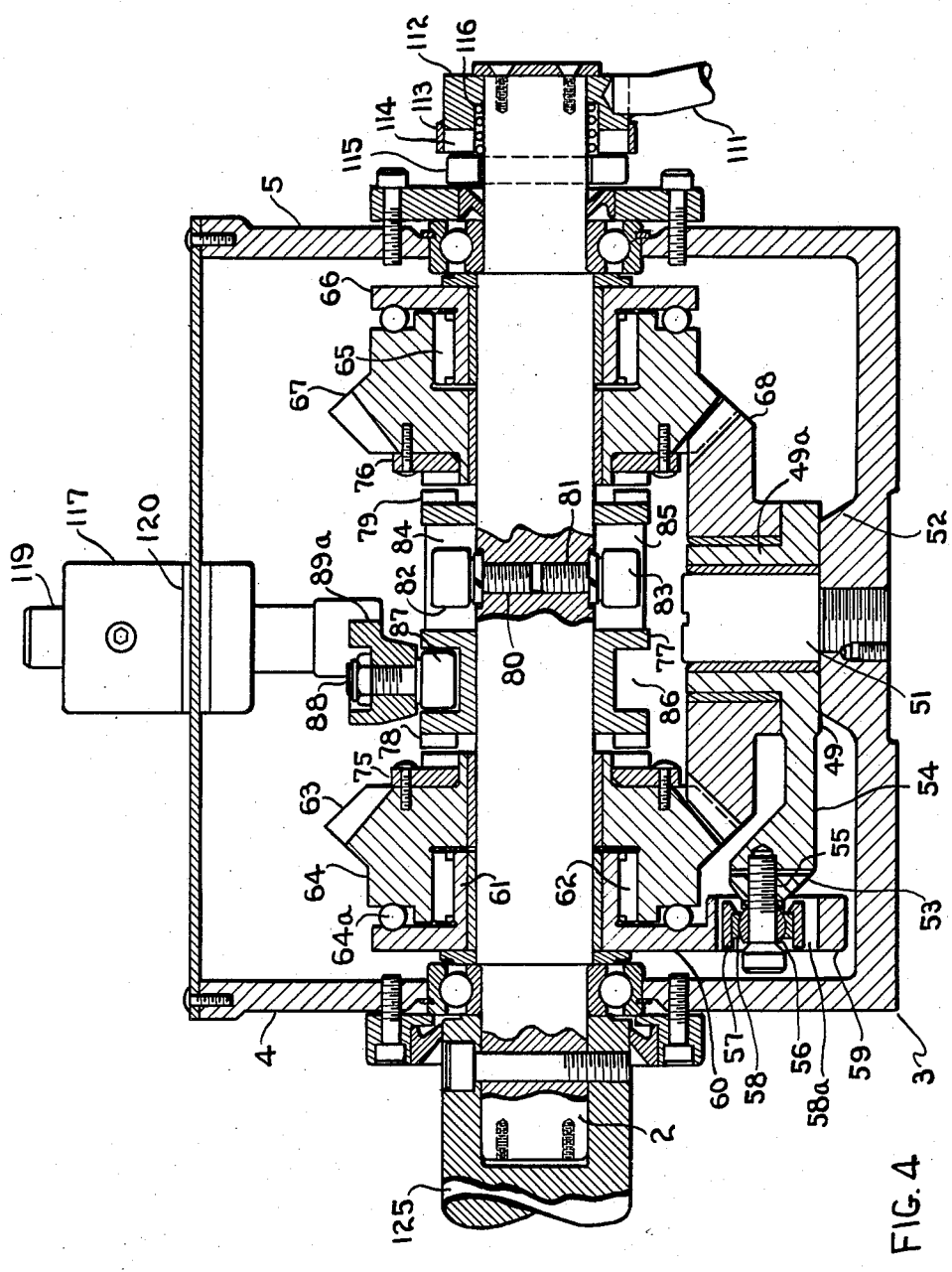

United States Patent Office 2,898,770
Patented Aug. 11, 1959

2,898,770

TRAVERSE DRIVE MECHANISM

Charles F. Van Hook, Fairlawn, N.J.

Application August 31, 1955, Serial No. 531,774

4 Claims. (Cl. 74—123)

The invention herein disclosed relates to a traverse drive mechanism which while of general application is especially suitable for driving a traverse by which cable, for example, is laid on reels.

Heretofore, and prior to this invention it has been common practice to utilize a crank actuated pawl and ratchet in such drive mechanisms to effect movement of the driven shaft or the traverse screw. This resulted in a distinctly and incrementally-varied angular motion of the driven shaft. An object of this invention is to provide a traverse drive mechanism by which a substantially uniform motion of the driven shaft and traverse screw is obtained.

The foregoing, other objects and certain advantages that will hereinafter appear are realized in the particular embodiment of the invention illustrated in the accompanying drawings and described in detail below, from which description a clear understanding of the invention may be had.

Figure 1:
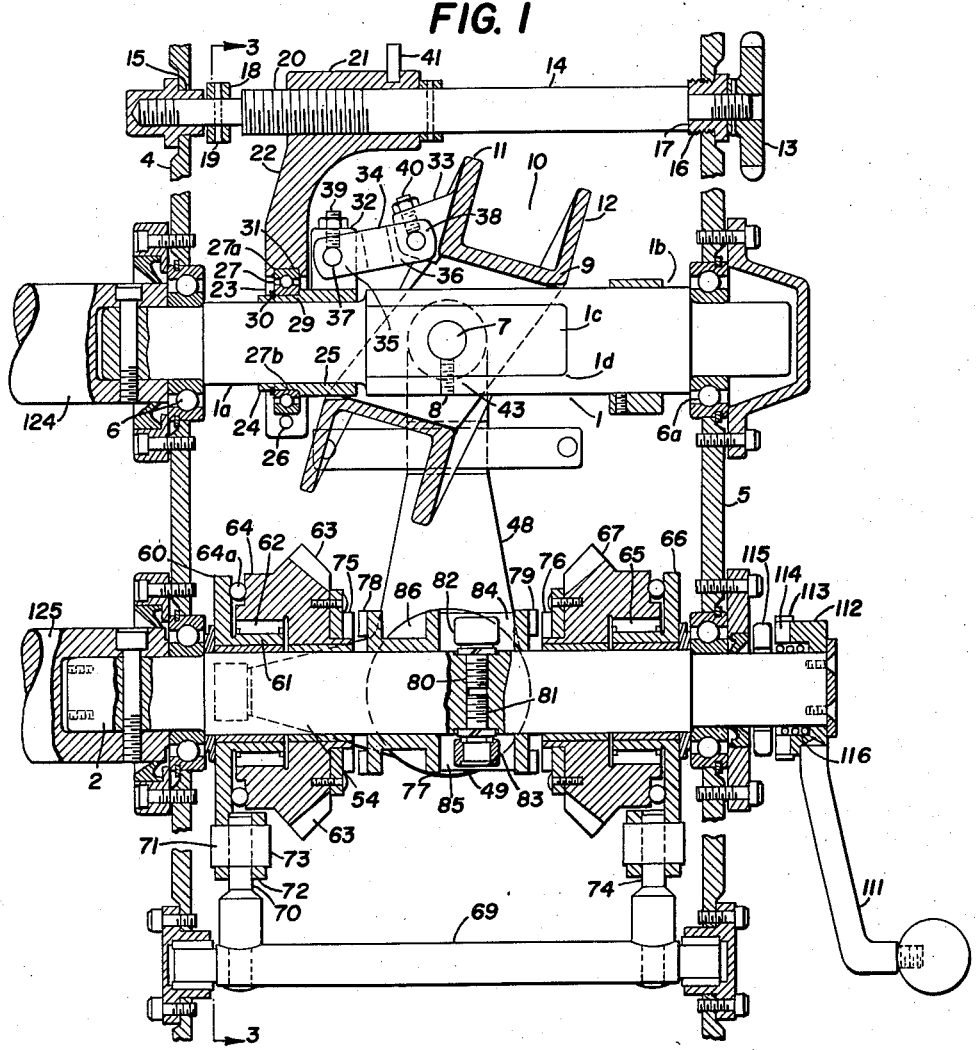
Figure 2:
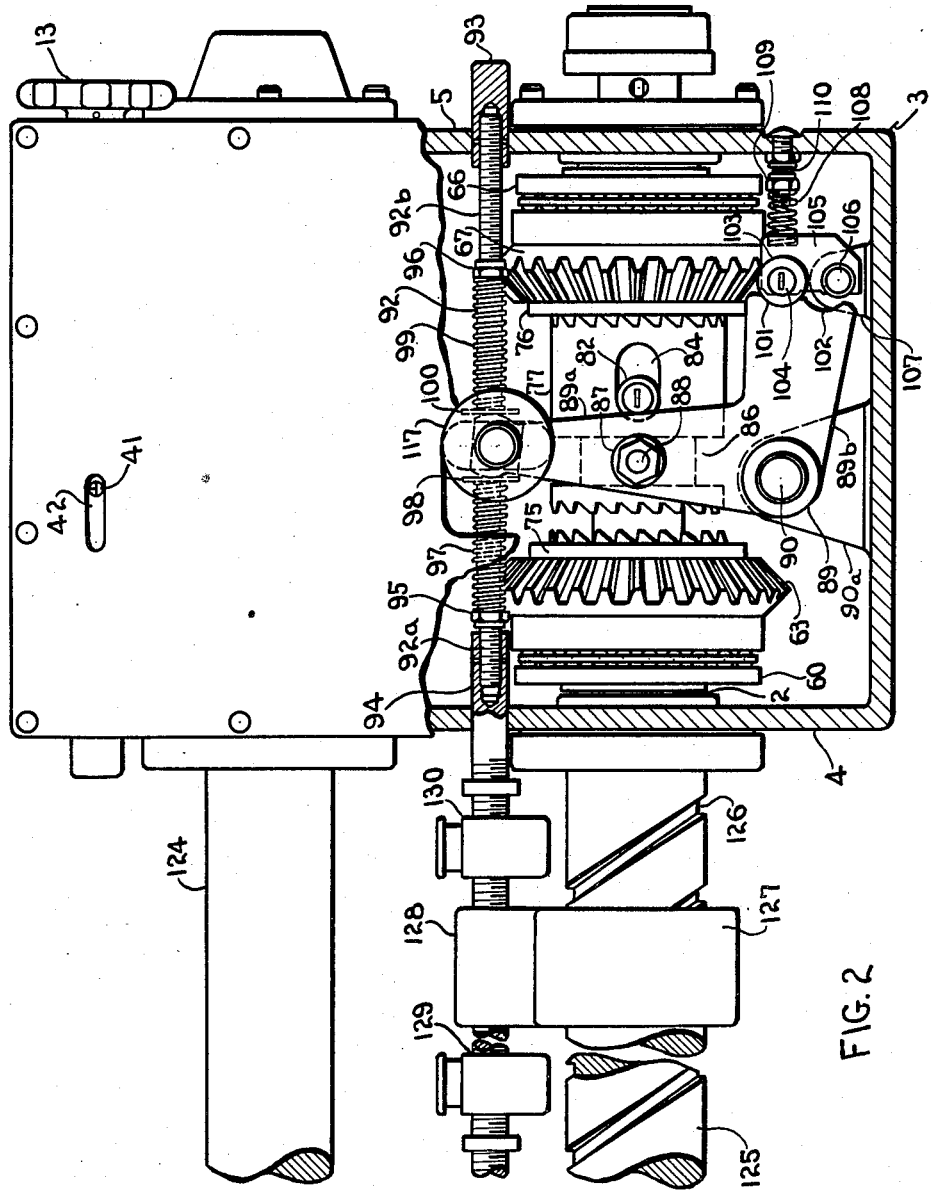

The drawings include:

Fig. 1 which is a sectional plan of a traverse drive mechanism embodying the invention;

Fig. 2 which is a plan, partially in section, of the same;

Fig. 3 which is a section taken on the line 3—3 of Fig. 1;

Fig. 4 which is a section taken on the line 4—4 of Fig. 2;

Fig. 5 which is a partial section taken on the line 5—5 of Fig. 3; and

Fig. 6 which is a plan of a control knob.

In general, the traverse drive mechanism illustrated in the drawings includes a drive shaft 1, and a driven shaft 2 and intermediate mechanism for transmitting motion from the drive shaft. The entire mechanism is enclosed and mounted in a housing 3.

The drive shaft 1 extends through the side walls 4 and 5 of the housing 3 and is journalled in ball bearings 6 and 6a in the side walls. This shaft consists of two sections 1a and 1b; the section 1a has a reduced end portion 1c that extends into an axial bore 1d in the end portion of the section 1b. The two sections are held together by a transverse pin 7 fixed therein by a set screw 8 and extending therethrough. On the extended ends of the pin 7, a cam 9 is pivotally mounted.

The cam 9 is a continuous cam surrounding the drive shaft. It is of channel shape in cross section, that is, it has an edge groove 10. The side walls 11 and 12 of the groove 10 which constitute the cam surfaces have an undulating or wave form. Desirably, the cam surfaces are in the form of a helix, and may deviate somewhat from the exact form of a helix to effect certain purposes.

The cam 9 may be tilted about the pivot pin 7 by manipulating a hand wheel 13. This hand wheel is fixed on the end of a shaft 14 that extends through and is journaled in bushings 15 and 16 threaded into the side walls 4 and 5 of the housing 3. The shaft 14 is parallel to the drive shaft 1. It is held against axial movement by a shoulder 17 formed thereon and engaging the end of the bushing 16 and rollers 18 mounted on a pin 19 extending through the shaft, the rollers 18 engaging the edge of the bushing 15. A portion of the shaft 14, adjacent the bushing 15, has a thread 20 thereon which engages an internal thread in a boss 21 forming a part of a bracket 22 extending from the shaft 14 to the drive shaft 1. The bracket 22 terminates in a yoke 23 that embraces the reduced end portion 24 of a bushing 25 slidably mounted on the drive shaft 1. A bolt 26 extending between the arms of the yoke 23, serves to clamp the yoke on the outer raceway 27a of a ball bearing 27 which ball bearing is between the yoke and the end portion 24 of the bushing 25. One side the inner raceway 27b of the ball bearing 27 engages the shoulder 29 on the bushing 25 and a retaining ring 30 extending from a circumferential groove in the section 24 of the bushing 25 engages the opposite side of the inner raceway. The outer raceway 27a of the ball bearing 27 is received in a groove 31 in the yoke 23. Thus, when the hand wheel 13 is manipulated the shaft 14 is rotated and through the threaded engagement with the boss 21, the bracket 22, and in consequence, the bushing 25, is moved along the drive shaft.

The bushing 25 is connected to the cam 9. To this end there is secured to the bushing 25, a radially extending lug 32, and a like lug 33 extends from the side wall 11 of the cam 9. A link 34, having bifurcated end sections 35 and 36 extends between the lugs 32 and 33, the end section 35 embracing the lug 32 and being pivotally secured thereto by a pivot pin 37, and the end section 36 embracing the lug 33 and being pivotally secured thereto by a pivot pin 38. The pins 37 and 38 extend through the lugs 32 and 33 and are held therein by set screws 39 and 40 respectively. Thus, as the bushing 25 is moved axially of the shaft, the cam 9 is tilted about the pivot pin 7 and may be positioned from the mean position, to any tilt desired. A pin 41 secured in and extending from the boss 21 of the bracket 22, extends through a slot 42 in the housing. The position of the pin indicates the tilt of the cam.

Within the cam groove 10, there is a cam follower 43. The cam follower includes a cylindrical member 44 on which there is mounted axially spaced ball bearings 45 and 46. The outer raceways of the ball bearings 45 and 46 engage the inner surfaces of the side walls 11 and 12, i.e., the cam surfaces of the cam groove. The cylindrical member 44 is pivotally mounted on a stud 47 that extends from the end of one arm 48 of a bell crank lever 49. A pivot pin 50 extends through the stud 47 and the cylindrical member 44. As the stud is of lesser width, transversely of the axis of the pivot pin 50 (Fig. 5), than the internal diameter of the cylindrical member, the latter may rock about the pivot pin 50. It is to be noted that the pivot pin 50 extends at right angles to a diametrical plane through the axis of the drive shaft. Thus, the cam follower may rock in one plane relative to the lever arm 48, and so maintain true contact with the cam surfaces on radial lines to the axis of the cam.

The bell crank lever 49 has a hub 49a that is pivotally mounted on a pivot 51 secured in, and extending from a boss 52 formed on the wall of the housing 3. An offset end portion 53 is formed on the arm 54 which, with the arm 48, constitutes the bell crank lever 49. Secured to this offset portion, in the end thereof, there is a ball joint assembly consisting of a stud 55 threaded into the end of the arm, a spherical sector 56 secured on the stud and a member 57 having a socket element 58 engaging the spherical sector 56. The member 57 has parallel flat sides and extends into and engages the sides of an elongated slot 58a through a radial extension 59 on a disk 60 that is rotatably mounted on the driven shaft 2 adjacent the side wall 4 of the housing 3.

As the cam 9 rotates the bell crank lever 49 is oscillated. It is to be noted that in the construction shown the cam 9 can be tilted in but one direction. In the mean position, i.e. in which the base of the cam groove 10 is parallel to the axis of the drive shaft 1, the lever will be oscillated due to the undulating cam surfaces. Thus, in all positions of the cam the bell crank lever 49 is oscillated, the extent of the oscillations increasing as the cam 9 is tilted from the mean position. In fact, as the cam is tilted there is superimposed on the oscillation due to the undulating cam surfaces an oscillation due to and to the extent of the tilt of the cam.

The disk 60, has a hub 61 formed thereon which embraces a bearing bushing on the driven shaft 2. This disk 60 and the hub 61 constitute one element of a one-way, infinite clutch designated generally by the numeral 62. Such clutches are well known in the art and need not be described in detail herein. The other or driven element of the one-way clutch 62 is in the form of a bevel gear 63 rotatably mounted on the shaft 2 and having a hub 64 overhanging the hub 61. Anti-friction ball bearings 64a are provided between the disk 60 and the bevel gear 63.

A similar one-way clutch 65 is mounted on the shaft 2 adjacent the side wall 5 of the housing 3. This clutch includes a disk 66 and a bevel gear 67, both rotatably mounted on the shaft 2. The bevel gear 67 faces the bevel gear 63, and both mesh with a third bevel gear 68 rotatable upon the hub 49a of the lever 49.

The clutch 65 is arranged to engage during movement in the direction opposite to that of the clutch 62. The disk 66 of the clutch 65 is actuated jointly with the disk 60 of the clutch 63. For this purpose, a shaft 69 extends between and is journaled in the side walls 4 and 5 of the housing 3. A rod 70 extends radially from the shaft 69 into a radial slot 71 in a portion 72 of the extension 59 on the disk 60, and through a transverse pin 73 journaled in the portion 72 of the extension 59. A like rod 74 extends from the shaft 69 adjacent the other end thereof and is connected in like manner to the disk 66 of the clutch 65. Thus, as the disk 60 is oscillated by the bell crank lever 49, the disk 66 is also oscillated.

As previously stated, the clutches 62 and 65 engage in opposite directions of rotation. Hence on one stroke of the bell crank lever 49, the clutch 62 is engaged to move the gear 63, while the clutch 65 is ineffective. On the return stroke of the lever 49, the clutch 65 is engaged to move the gear 67 in the opposite direction of rotation, while the clutch 62 is ineffective. Such clutches seize immediately on movement in engaging direction, and as the gears 63 and 67 are coupled together by the gear 68, there is substantially continuous rotation of both gears in opposite directions of rotation.

On the face of the gear 63, there is secured a saw-tooth clutch element 75, and on the face of the gear 67, there is secured a like saw-tooth clutch element 76. The inclination of the teeth on the clutch element 75 is opposite to that on the element 76. Intermediate the gears 63 and 67, there is slidably mounted on the driven shaft 2, an engaging clutch member 77. This consists of a cylindrical hub having apropriate saw-tooth ends 78 and 79 for engagement with the saw-tooth elements 75 and 76 respectively. The clutch member 77 is secured to the shaft 2 for rotation therewith by head screws 80 and 81 threaded into the shaft and extending from diametrically opposite sides of the shaft. Each pin has a roller 82 and 83, respectively fixed on the head thereof, which rollers are received in and engage the sides of elongated, diametrically opposed slots 84 and 85 in the element 77.

By shifting the clutch member 77 along the shaft it is brought into driving engagement with either of the clutch elements 75 or 76. This is effected automatically to reverse the direction of rotation of the driven shaft. For this purpose, the clutch member is provided with a circumferential groove 86 into which there extends a roller 87 mounted on a bolt 88 that is secured to, and intermediate the ends of one arm 89a of a bell crank lever 89 that is pivoted at 90 on a support 90a extending from the end wall of the housing. The arm 89a of the bell crank lever 89 has a forked end section 91 which embraces a rod 92. The rod 92 is threaded at both ends, 92a and 92b. One end, 92b, of the rod 92 is received in and fixed to a fitting 93 that is slidable in an opening through the side wall 5 of the housing. The other end, 92a of the rod 92 is received in an end bore in a control rod 94 that extends through and is slidably mounted in an opening in the side wall 4 of the housing. The threads on the ends of the rod 92 extend beyond the fitting 93 and the control rod 94. On the end 92a, there is a nut and check nut combination 95, and on the end 92b there is also a nut and check nut combination 96. A spring 97, on the rod 92 abuts against the nut combination 95 at one end thereof and at the other end abuts against a perforated disk 98 that is in contact with one side of the forked end section 91 of the lever arm 89a. A like spring 99 on the rod 92 abuts, at one end, against the nut combination 96 and at the other against a perforated disk 100 that is in contact with the other side of the forked end section 91 of the lever arm 89a. By adjusting the nut combinations 95 and 96, the force exerted by the springs 97 and 99 on the lever arm 89a may be adjusted so that the forces exerted by the springs are substantially equal and opposite in the neutral position of the lever arm, i.e. the position in which the clutch member 77 is central of and disengaged from both clutch elements 75 and 76.

The other arm 89b of the lever 89 is utilized as part of a resilient, over-center mechanism that provides a snap action movement of the clutching member 77 when shifted from engagement with one of the clutch elements 75, 76 to engagement with the other clutch element. The end edge of the arm 89b has two, slightly spaced, detent receiving recesses 101 and 102 of circular-sector configuration which cooperate with a resiliently pressed detent 103 in the form of a roller. The detent 103 is mounted on a pin 104 which pin is secured to an arm 105 pivoted at 106 to a lug 107 formed on the end wall of the housing. The arm 105 is resiliently urged toward the end of the lever arm 89b by a spring 108, one end of which spring is received in a recess in the arm and the other end of which spring engages a nut 109 on a screw 110 extending through and fixed with respect to the side wall 5 of the housing 3.

In operation, considering Fig. 2, if the rod 92 be moved to the left, the spring 99 will be compressed. When compressed, the pressure it exerts on the lever arm 89a increases until it overcomes the resistance of the detent 103 to leave the recess 101. When this occurs, the lever 89 is actuated, the detent 103 moving, with a snap action into the recess 102, and the clutch member 77 is shifted and resiliently held in engagement with the clutch element 75. In like manner, thereafter, movement of the rod 92 in the opposite direction effects a reversal of the clutch member 77. However, until either of the springs 99 or 97, as the case may be, builds up enough pressure, the detent 103 in cooperation with one or the other of the recesses 101 or 102 restrains movement of the clutch member 77 and so maintains engagement with one of the other of the clutch elements 75 or 76.

In the particular embodiment of the invention illustrated, provision is made for manual operation of the driven shaft 2, without affecting the mechanism described above. On the end of the shaft 2 that extends through the side wall 5 of the housing 3, there is rotatably and slidably mounted a hand crank 111. The hub 112 of the hand crank has an end section 113 with one or more diametrical grooves 114 in the end edge thereof. These grooves 114 receive, when the crank is pressed toward the side wall 5, a pin 115 extending through the shaft 2. The shaft 2 is thus connected to the hand crank 111.

Normally, the hand crank is resiliently urged away from engagement with the pin 115 by a spring 116.

When the hand crank 111 is used to actuate the driven shaft 2, the clutch member 77 is placed in a neutral position, that is, positioned so that it does not engage either of the clutch elements 75 or 76. In the particular mechanism illustrated this is effected through a knob 117 that extends through a circular opening 118 in the cover of the housing 3. The knob 117 is rotatably mounted on a stud screw 119 that is threaded into a lug 91a formed on the forked end 91 of the arm 89a of the lever 89. Intermediate its ends, and in the plane of the cover of the housing 3, the knob 117 has transverse, elongated, diametrically opposed radial slots 120.

With the knob 117 orientated at the position shown in Figs. 3 and 4, the peripheral surface thereof, between the slots 120, engages the edges of the opening 118 in the cover in the direction of the movement of the lever arm 89a. In this position of the knob 117, the lever is restrained against movement, the detent 103 is mid way between the recesses 101 and 102 and the clutch member 77 is, as shown in Fig. 4, in a neutral position—disengaged. The knob 117 is so positioned when the hand crank 111 is used to rotate the shaft 2.

When the knob 117 is rotated ninety degrees, the slots 120 are positioned in the direction of movement of the lever arm 89a. Thus, the lever is free to move under the action of the springs 97 and 99. Detent receiving recesses 121 and 122 are provided in the stud screw 119 and cooperate with a spring pressed detent 123 mounted in the knob 117 for positioning the knob in either operative or neutral positions.

In use, the traverse drive mechanism illustrated and described above is connected either directly or through connecting gears or linkage to a power shaft 124 and a traverse shaft 125. The traverse shaft 125 has a helicoidal groove 126 which engages with a complementary internal helix in a traverse, such for example, as the traverse 127. The traverse 127 has a section 128 that embraces the control rod 94. On the control rod, there are, adjustably mounted, abutments 129 and 130. As the traverse moves, it contacts one or the other of the abutments, and moves the control rod 94, depending on the direction of movement of the traverse, until the clutch member 77 shifts as above described.

From the foregoing description of the particular embodiment of the invention illustrated in the drawings, it will be apparent to those skilled in the art that by this invention there is provided an adjustable traverse drive mechanism that provides a direct ratio, increment for increment, between the drive and driven shafts; that provides a substantially continuous rotation of the driven shaft; that is universal in its application in that it may be applied to existing machines; and that is comparatively economical to manufacture.

It will be obvious that various changes may be made by those skilled in the art in the details of the embodiment of the invention illustrated in the drawing and described above within the scope of the invention as expressed in the appended claims.

I claim:

1. A traverse mechanism of the kind described comprising in combination a drive shaft, a driven shaft, a pair of one-way infinite clutches arranged for clutching engagement in opposite directions of rotation, each of said clutches having a driving and driven member, means connecting said clutches and said drive shaft for effecting oscillation of the driving members of the clutches, a bevel gear associated with each of the said clutches and arranged to be actuated through the clutch associated therewith, another bevel gear meshing with both bevel gears actuated through said clutches, and means for connecting one of said bevel gears to said driven shaft whereby substantially continuous rotation of the driven shaft is effected.

2. A traverse mechanism of the kind described comprising in combination a drive shaft, a driven shaft, a pair of one-way infinite clutches arranged for clutching engagement in opposite directions of rotation, each of said clutches having a driving and driven member, means connecting said clutches and said drive shaft for effecting oscillation of the driving members of the clutches, a bevel gear associated with each of the said clutches and arranged to be actuated through the clutch associated therewith, another bevel gear meshing with both bevel gears actuated through said clutches, and means for connecting said driven shaft to either of the bevel gears actuated through said clutches, whereby substantially continuous rotation of the driven shaft may be effected in either direction.

3. A traverse mechanism of the kind described comprising in combination a drive shaft, a driven shaft, a pair of one-way infinite clutches arranged for clutching engagement in opposite directions of rotation, each of said clutches having a driving and driven member, means connecting said clutches and said drive shaft for effecting oscillation of the driving members of said clutches including a cam mounted on the drive shaft and having an undulating cam surface, a pivotally mounted bell crank lever, a cam follower mounted on one arm of the bell crank lever and engaging said undulating cam surface and means connecting both said clutches to the other arm of the bell crank lever for joint oscillation thereof, and means for translating the oscillation of one or the other of said clutches to effect substantially continuous rotation of the driven shaft.

4. A traverse mechanism of the kind described comprising in combination a drive shaft, a driven shaft, a cam having a cam surface in the form of a helix tiltably mounted on the drive shaft and secured thereto for rotation therewith, a pair of one-way infinite clutches arranged for clutching engagement in opposite directions of rotation, each of said clutches having a driving and driven member, a pivotally mounted bell crank lever, a cam follower secured to one arm of said bell crank lever and engaging said helical cam surface, means connecting both of said clutches to the other arm of said lever for joint oscillation of the driving members thereof, a bevel gear associated with each of said clutches and arranged to be actuated through the clutch associated therewith, another bevel gear meshing with both the bevel gears actuated through said clutches, and means for connecting said driven shaft to either of the bevel gears actuated through said clutches, whereby substantially continuous rotation of the driven shaft may be effected in either direction.

References Cited in the file of this patent

UNITED STATES PATENTS

| | | |
|---|---|---|
| 1,052,010 | Neswold | Feb. 4, 1913 |
| 1,169,715 | Erickson | Jan. 25, 1916 |
| 1,308,104 | Parsons | July 1, 1919 |
| 1,632,091 | Mitchell | June 14, 1927 |
| 1,694,961 | Basler | Dec. 11, 1928 |
| 2,199,051 | Laub | Apr. 30, 1940 |
| 2,427,598 | Gouiraud | Sept. 16, 1947 |
| 2,522,607 | Dedieu | Sept. 19, 1950 |

FOREIGN PATENTS

| | | |
|---|---|---|
| 8,503 | Great Britain | June 19, 1913 |
| 336,345 | France | Oct. 13, 1905 |
| 369,121 | France | Oct. 31, 1906 |
| 539,219 | France | Mar. 30, 1922 |